(12) United States Patent
McLean

(10) Patent No.: US 8,517,741 B1
(45) Date of Patent: Aug. 27, 2013

(54) SKULL MOUNTING AND CASTING SYSTEM

(76) Inventor: Delmere G. McLean, Luverne, ND (US)

( * ) Notice: Subject to any disclaimer, the term of this patent is extended or adjusted under 35 U.S.C. 154(b) by 184 days.

(21) Appl. No.: 13/172,011

(22) Filed: Jun. 29, 2011

(51) Int. Cl.
*G09B 23/36* (2006.01)

(52) U.S. Cl.
USPC .......................................... 434/296; 434/295

(58) Field of Classification Search
USPC .................................. 434/295, 296
See application file for complete search history.

(56) References Cited

U.S. PATENT DOCUMENTS

| | | | |
|---|---|---|---|
| 4,464,440 A | 8/1984 | Dotzman | |
| 4,717,626 A * | 1/1988 | Badger | 428/542.4 |
| 5,472,765 A | 12/1995 | Green | |
| 7,243,888 B2 | 7/2007 | Peek | |
| 7,857,266 B2 | 12/2010 | Damin | |
| 2006/0154224 A1 | 7/2006 | St. Ama | |
| 2008/0069977 A1 | 3/2008 | McAbee | |
| 2009/0230260 A1* | 9/2009 | Damin | 248/126 |
| 2011/0031363 A1* | 2/2011 | Shaw | 248/220.22 |

OTHER PUBLICATIONS

Skull Taxidermy, www.skulltaxidermy.com/metalphotos.html, Jan. 28, 2006.*
"How to—Prepare a European Skull Mount", www.skinnymoose.com/mostlyarchery/2009/07/07/how-to-prepare-a-european-skull-mount, Jul. 7, 2007.*

* cited by examiner

*Primary Examiner* — Benjamin Layno
(74) *Attorney, Agent, or Firm* — Jason L. Gilbert

(57) ABSTRACT

A skull mounting and casting system for preparing and mounting a skull on a base in a manner which simulates the aesthetics of a unitary sculpture. The skull mounting and casting system generally includes a housing to which a game trophy such as a skull is mounted and casted in a manner which simulates the appearance of a unitary sculpture. The housing will generally include a base and a mounting portion. The mounting portion will generally include a raised fin and a pair of recessed portions. The skull will generally be secured to the housing with a bonding agent, wherein the raised fin is secured within the skull's inner cavity and the jaw of the skull is secured within the recessed portions. After mounting, the housing and skull are both coated with a finishing product such as bronze to create the appearance of a unitary sculpture.

10 Claims, 9 Drawing Sheets

US 8,517,741 B1

SKULL MOUNTING AND CASTING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a skull mounting system and more specifically it relates to a skull mounting and casting system for preparing and mounting a skull on a base in a manner which simulates the aesthetics of a unitary sculpture.

2. Description of the Related Art

Any discussion of the related art throughout the specification should in no way be considered as an admission that such related art is widely known or forms part of common general knowledge in the field.

Hunters have been collecting, storing and displaying trophies of their exploits since the beginning of recorded history. Generally, a hunter will retain a portion of the game animal for future display. For example, deer hunters are well known for retaining and displaying the skull and/or antlers of their kills, with antlers having more "points" being considered the most desirable.

In the past, numerous mounts and other structures have been provided for mounting and displaying various game trophies such as skulls and/or antlers. Generally, the skull and/or antlers are fixated to a base, which is then attached to a wall or other vertical structure. In some cases, the skull and/or antlers are attached directly to a wall or other structure without the use of a base. However, until now, there does not appear to have been a mounting system which displays game trophies in a manner which simulates the appearance of a unitary sculpture.

Because of the inherent problems with the related art, there is a need for a new and improved skull mounting and casting system for preparing and mounting a skull on a base in a manner which simulates the aesthetics of a unitary sculpture.

BRIEF SUMMARY OF THE INVENTION

A system for preparing and mounting a skull on a base in a manner which simulates the aesthetics of a unitary sculpture. The invention generally relates to a skull mounting system which includes a housing to which a game trophy such as a skull is mounted and casted in a manner which simulates the appearance of a unitary sculpture. The housing will generally include a base and a mounting portion. The mounting portion will generally include a raised fin and a pair of recessed portions. The skull will generally be secured to the housing with a bonding agent, wherein the raised fin is secured within the skull's inner cavity and the jaw of the skull is secured within the recessed portions. After mounting, the housing and skull are both coated with a finishing product such as bronze to create the appearance of a unitary sculpture.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
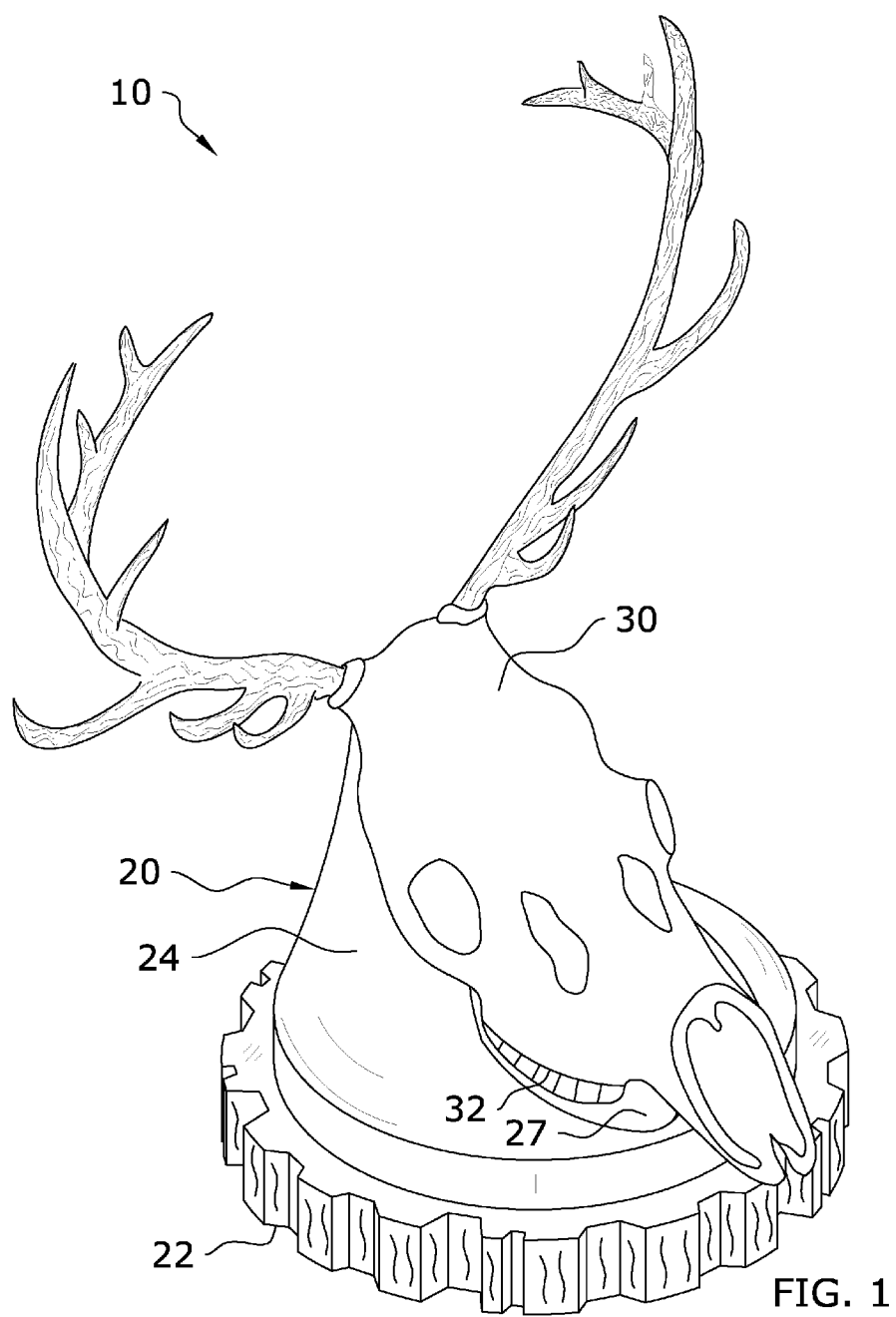
FIG. 1 is an upper perspective view of the present invention.

A. Overview.

Turning now descriptively to the drawings, in which similar reference characters denote similar elements throughout the several views, FIGS. 1 through 9 illustrate a skull mounting and casting system 10, which comprises a housing 20 to which a game trophy such as a skull 30 is mounted and casted in a manner which simulates the appearance of a unitary sculpture. The housing 20 will generally include a base 22 and a mounting portion 24. The mounting portion 24 will generally include a raised fin 25 and a pair of recessed portions 27, 28. The skull 30 will generally be secured to the housing 20 with a bonding agent, wherein the raised fin 25 is secured within the skull's 30 inner cavity and the jaw 32 of the skull 30 is secured within the recessed portions 27, 28. After mounting, the housing 20 and skull 30 are both coated with a finishing product such as bronze to create the appearance of a unitary sculpture.

B. Housing.

Figure 2:
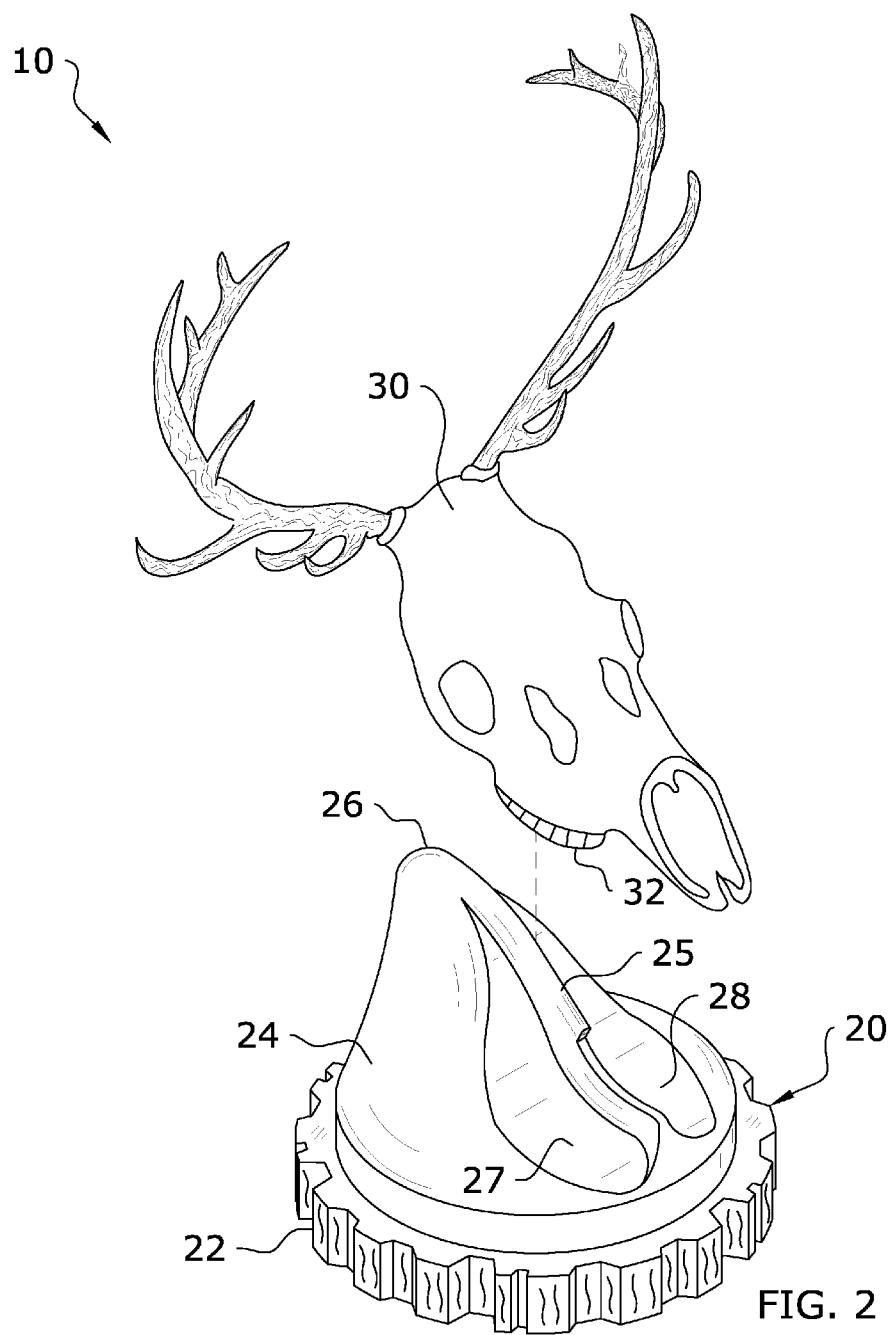
FIG. 2 is an upper perspective view of a skull being lowered onto the housing of the present invention.

The present invention will generally include a housing 20 to which the skull 30 of the present invention will be mounted. As shown in FIG. 2, the housing 20 of the present invention will generally be comprised of a base 22 and a mounting portion 24. The base 22 of the housing 20 will generally be comprised of the portion of the housing 20 which abuts against the surface on which the housing 20 will be placed (i.e. a wall or mantle). The base 22 may be comprised of various shapes and sizes, and should not be construed as being limited to the round design shown in the figures. The base 22 may also include fasteners or other structures which allow the housing 20 to be attached to a vertical or diagonal surface, such as a wall.

Figure 3:
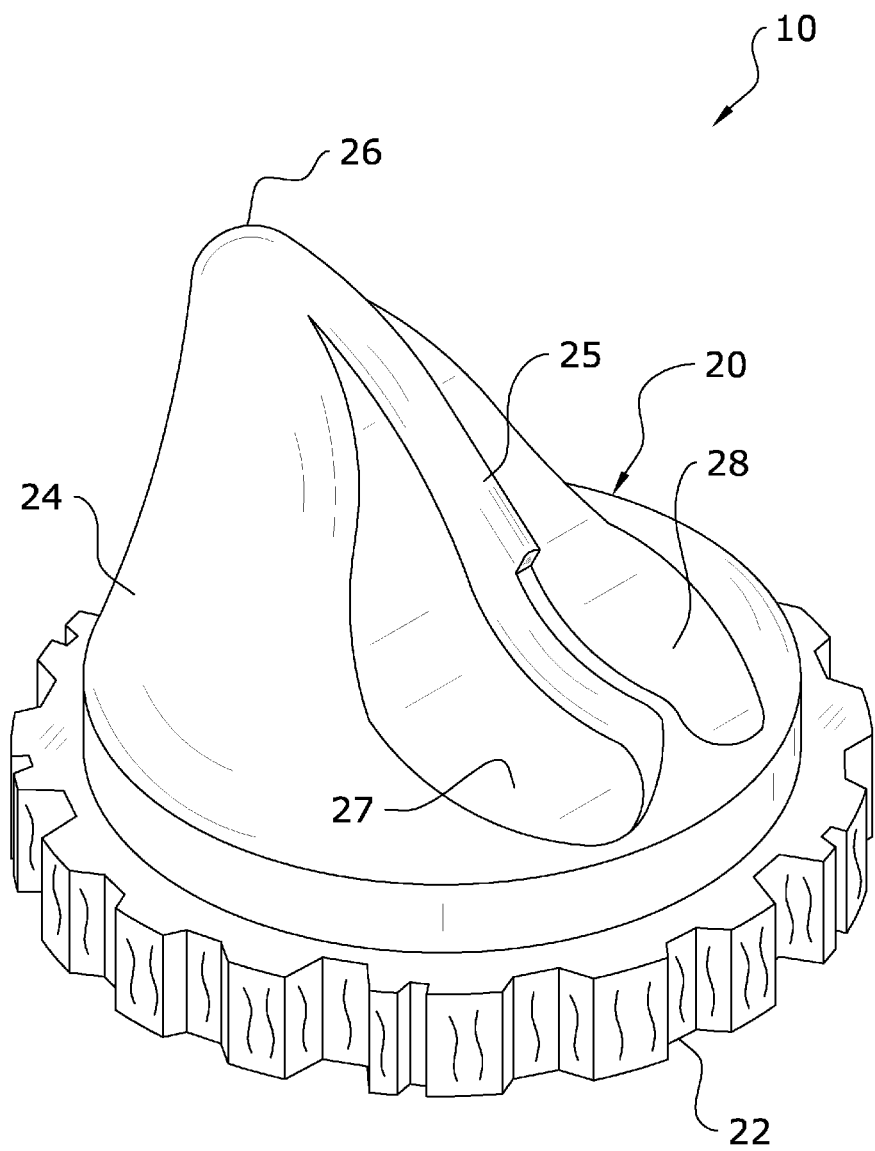
FIG. 3 is an upper perspective view of the housing of the present invention.
Figure 4:
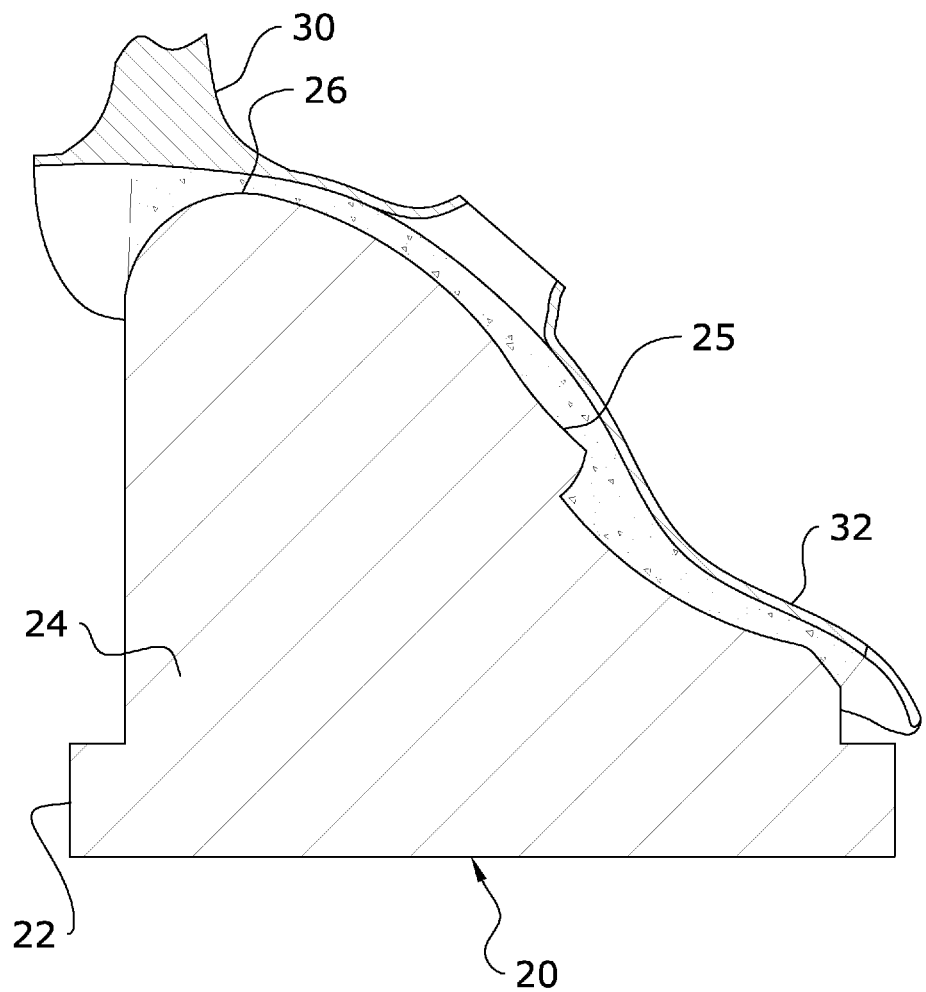
FIG. 4 is a side sectional view of the housing of the present invention.

The mounting portion 24 of the housing 20 of the present invention will generally be comprised of the portion of the housing 20 to which the skull 30 is secured with a bonding agent. As shown in FIG. 3, the mounting portion 24 of the housing 20 will generally be comprised of a fin-shaped structure which extends from the base 22 of the housing 20. Such a configuration allows the mounting portion 24 to more easily fit and secure against the inner contour of the skull 30 when the present invention is in use. However, it is appreciated that various other shapes and sizes may be utilized for the mounting portion 24 of the housing 20 to suit different applications (i.e. different types/sizes of skulls 30).

Figure 5:
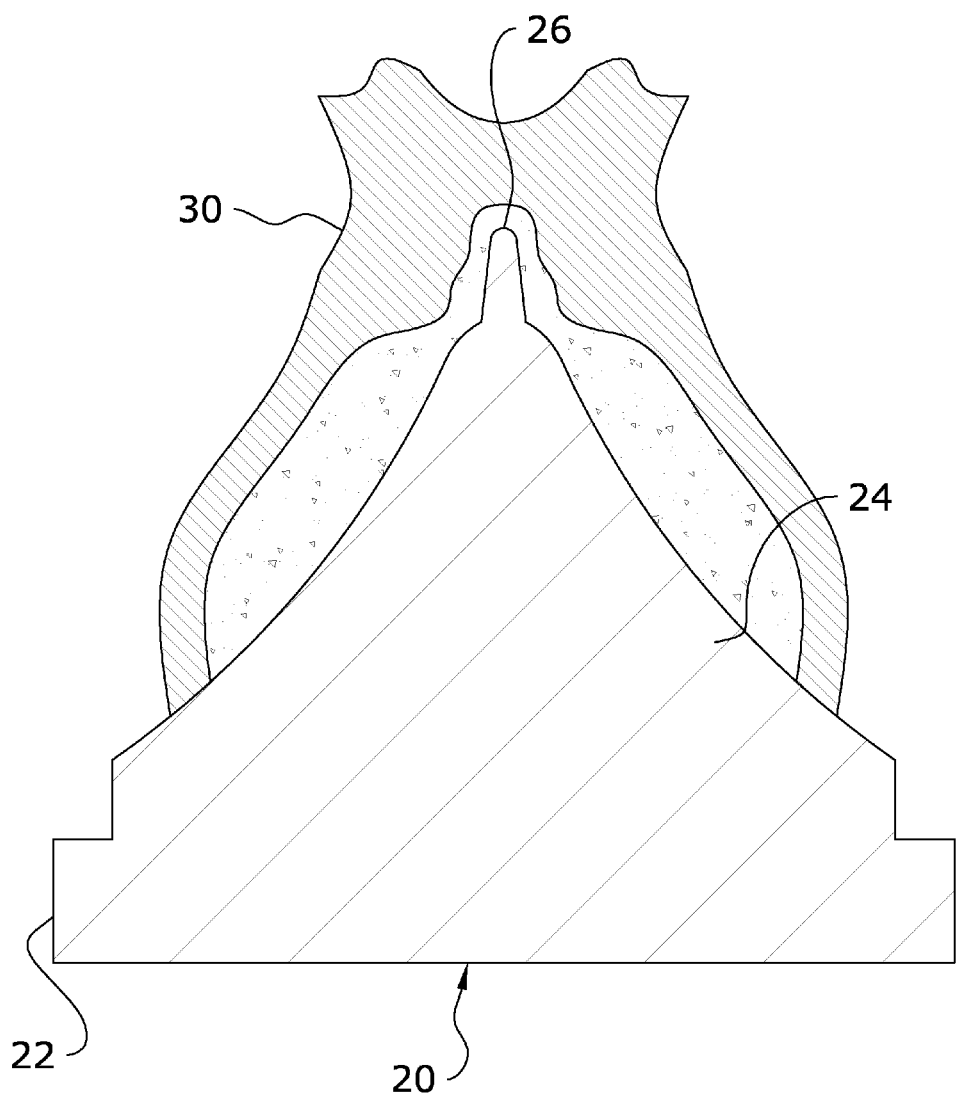
FIG. 5 is a rear sectional view of the housing of the present invention.
Figure 6:
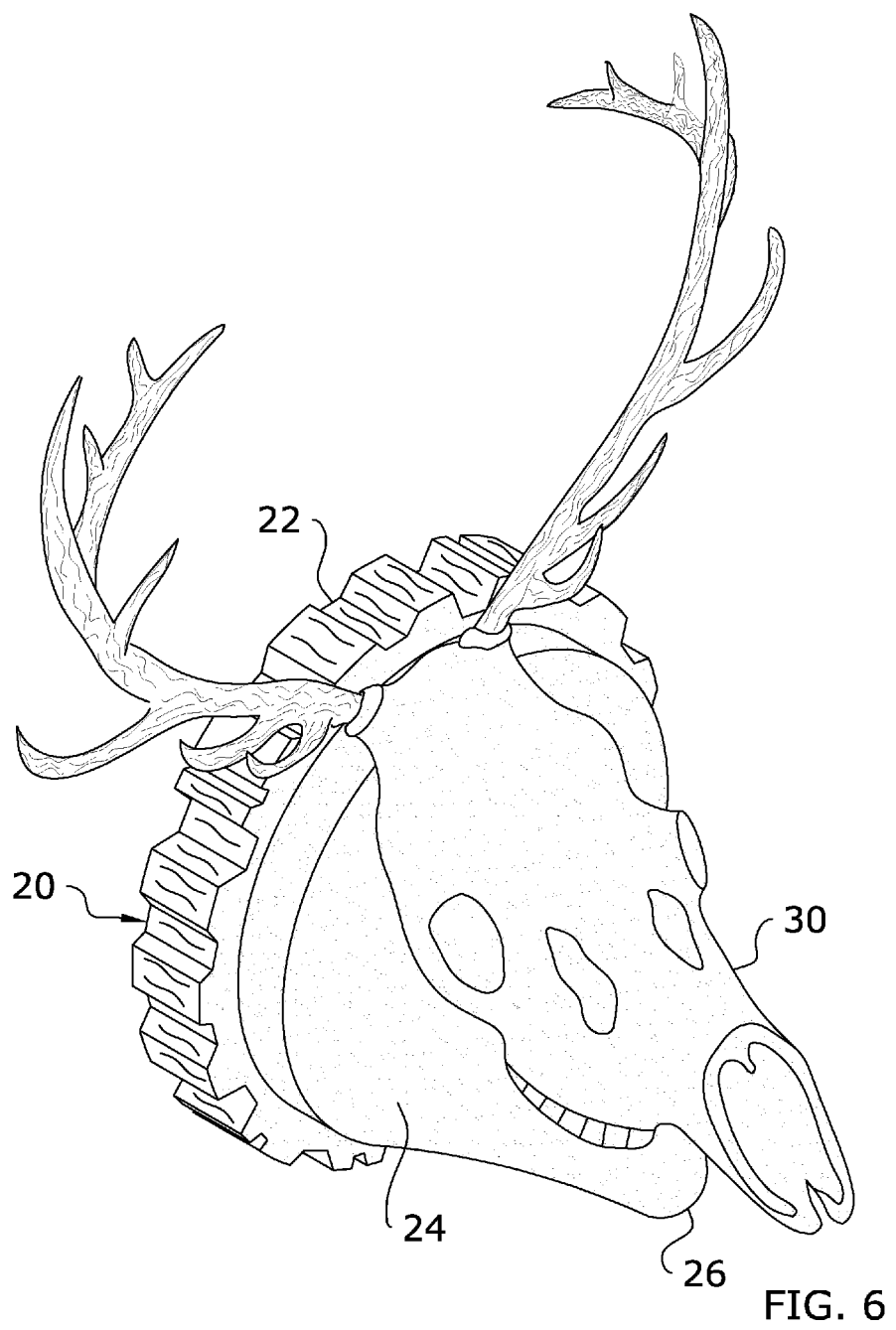
FIG. 6 is an upper perspective view of the finished present invention mounted on a wall.

As shown in FIG. 3, the mounting portion 24 of the housing 20 of the present invention will generally include a raised fin 25 and an upper point 26. The raised fin 25 will generally extend at least partially along the length of the mounting portion 24 and act as an anchor point when securing the skull 30 to the housing 20 with a bonding agent. The upper point 26 will generally be comprised of the upper end of the "fin"-shaped mounting portion 24 and will generally abut against the upper interior of the skull 30 when it is mounted and secured to the housing 20 as shown in FIG. 5.

The mounting portion 24 of the housing 20 of the present invention will also generally include a pair of recessed portions 27, 28 as shown in FIG. 3. Preferably, a first recessed portion 27 will extend along a first side of the raised fin 25 and a second recessed portion 28 will extend along a second side of the raised fin 25. The recessed portion 27, 28 may be comprised of various depths and outer shapes, and thus should not be construed as being limited to the appearance or design shown in the figures. When a skull 30 is mounted on the housing 20 of the present invention, the jaws 32 of the skull 30 will generally be positioned within each of the recessed portions 27, 28 and secured therein with a bonding agent as shown in FIG. 1.

C. Skull.

The present invention will generally include a skull 30 to be mounted on the housing 20 as shown in FIG. 1. The present invention may be utilized with various types and sizes of skulls 30 and should not be construed as being limited to the deer skulls shown in the figures. Generally, the lower half (i.e. lower jaw) of the skull 30 will be removed prior to mounting, and only the upper jaw 32 will remain. The upper jaw 32 will generally be secured directly to the recessed portions 27, 28 of the housing 20 and the inner cavity of the skull 30 will generally be secured around the mounting portion 24 of the housing 20.

D. Operation of Preferred Embodiment.

Figure 7:
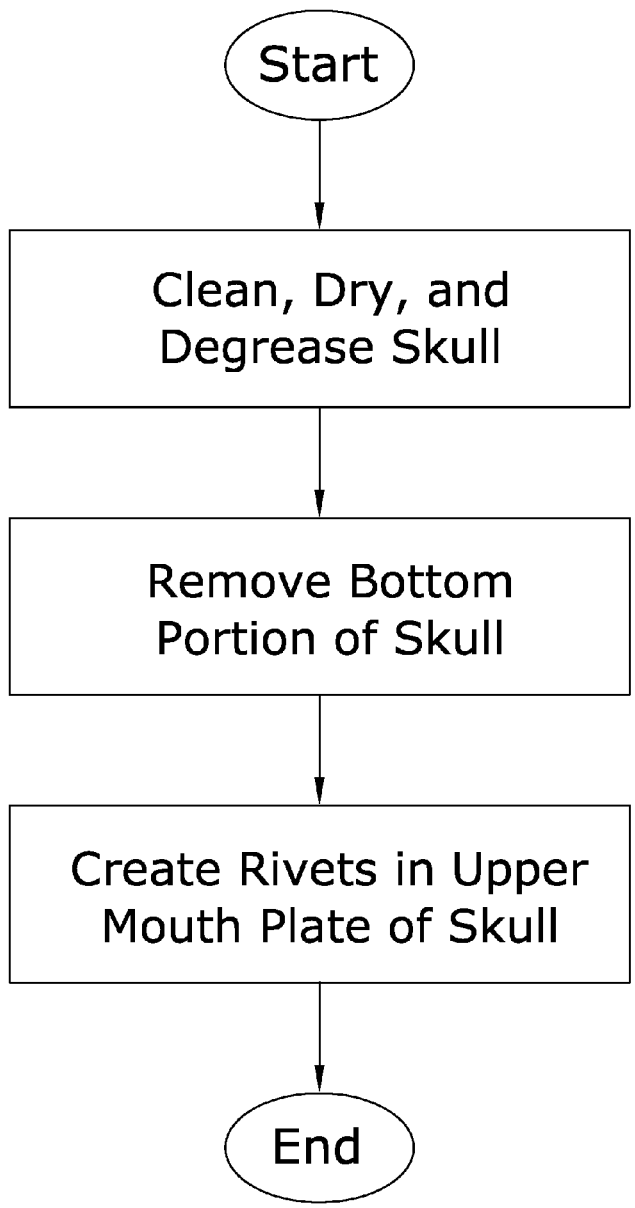
FIG. 7 is a flowchart detailing the initial preparation steps of the present invention.

In use, the skull 30 must first be prepared for mounting as illustrated in FIG. 7. First, the skull 30 is cleaned and dried. It is also degreased so that it is free from all oils in preparation for mounting. After cleaning, degreasing and drying, the lower half (i.e. lower jaw) of the skull 30 is removed. Openings or rivets are created in the area between the upper mouth plate of the skull 30 to aid in securing the skull 30 to the housing 20 during the bonding steps of the present invention.

Figure 8:
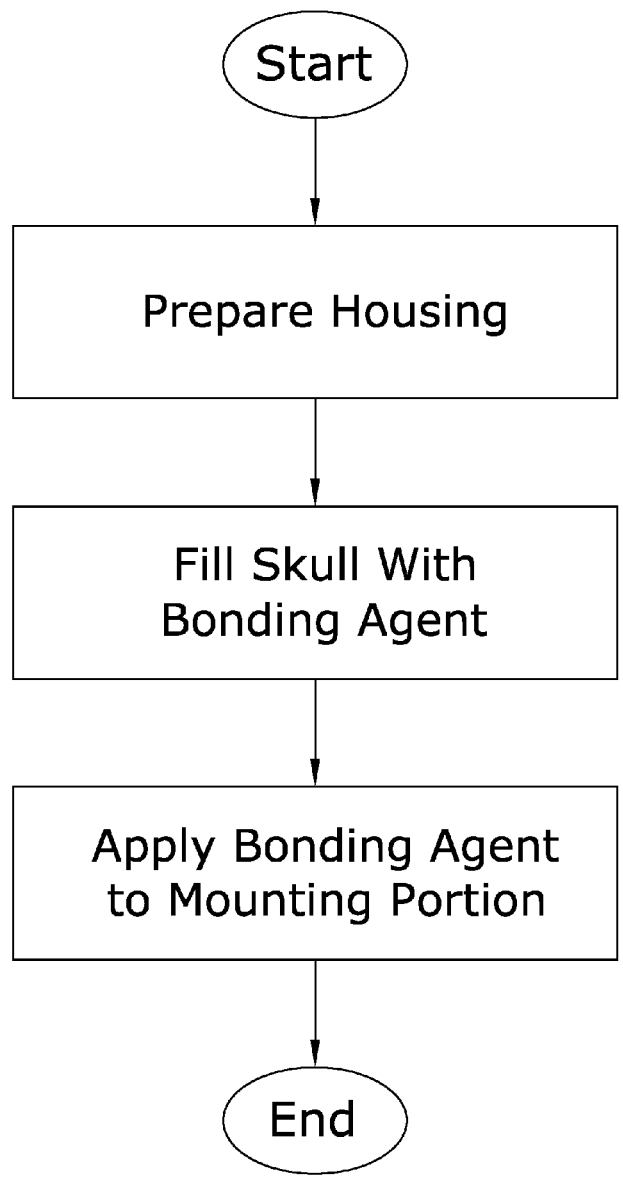
FIG. 8 is a flowchart detailing the bonding steps of the present invention.

As illustrated in FIG. 8, the housing 20 is then smoothed out by sanding or sand blasting to ensure proper adhesion of the bonding agent for mounting. The skull 30 is then filled with a bonding agent throughout its brain cavity as well as any empty or void areas where it will contact the housing 20. Various types of bonding agents may be utilized, including glues, epoxies and the like. The bonding agent is then additionally applied to the mounting portion 24 of the housing 20.

Figure 9:
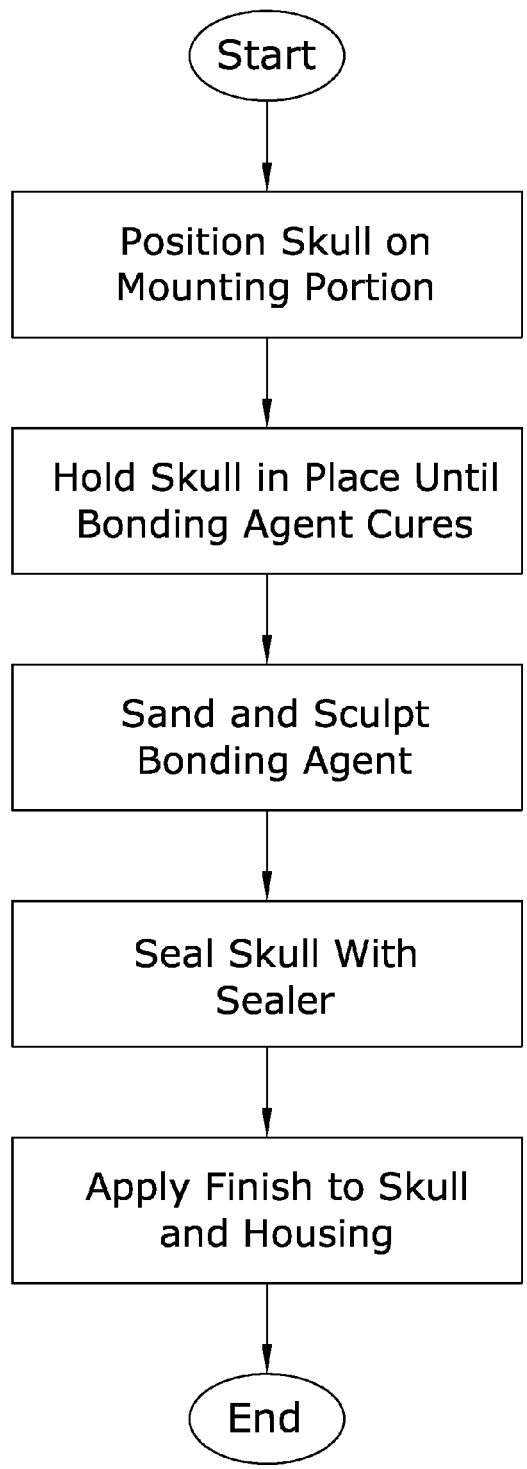
FIG. 9 is a flowchart detailing the mounting and finishing steps of the present invention.

As illustrated in FIG. 9, the skull 30 is then positioned on the mounting portion 24 of the housing 20 to create a proper fit for the housing 20. The skull 30 will generally be held in place while the bonding agent cures. The amount of time necessary for this step will vary depending on the type of bonding agent utilized.

After the bonding agent has cured and the skull 30 is secured to the housing 20, the bonding agent will be sanded and sculpted to create a seamless appearance. After bonding, sanding and sculpting, the skull 30 will be sealed with a sealing agent and prepared for finishing. Various types of sealing agents may be utilized. In a preferred embodiment, an automotive grade epoxy sealer will be utilized for the sealing agent.

After sealing, the present invention may be finished with a variety of finishing agents, including paints, stains, metal coatings and the like. Generally, the housing 20 and skull 30 will be coated with the finishing agent and allowed to dry to create the seamless, unitary sculpture appearance of the final product.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A method of mounting and casting a skull, comprising:
providing a skull, wherein said skull includes an upper jaw and a lower jaw;
providing a housing, wherein said housing includes a base and a mounting portion, wherein said mounting portion includes a first recessed area and a second recessed area and further comprising the steps of securing a first side of said upper jaw of said skull to said first recessed area and securing a second side of said upper jaw of said skull to said second recessed area;
removing said lower jaw of said skull;
positioning said skull on said mounting portion;
securing said skull to said housing with a bonding agent;
applying a sealing agent to said skull; and
coating said skull and said housing with a finishing agent.

2. The method of mounting and casting a skull of claim 1, further comprising the step of cleaning, degreasing and drying said skull prior to said step of positioning said skull on said mounting portion.

3. The method of mounting and casting a skull of claim 1, further comprising the step of creating a plurality of openings within an upper mouth plate portion of said skull.

4. The method of mounting and casting a skull of claim 1, further comprising the step of filling said skull with said bonding agent and applying said bonding agent to said housing.

5. The method of mounting and casting a skull of claim 4, further comprising the step of sanding and sculpting said bonding agent to achieve a seamless appearance.

6. The method of mounting and casting a skull of claim 1, wherein said skull is comprised of a deer skull.

7. The method of mounting and casting a skull of claim 1, wherein said finishing agent is comprised of a paint.

8. The method of mounting and casting a skull of claim 1, wherein said mounting portion includes a raised fin.

9. The method of mounting and casting a skull of claim 8, wherein said mounting portion includes an upper point.

10. A method of mounting and casting a skull, comprising:
   providing a skull, wherein said skull includes an upper jaw and a lower jaw;
   providing a housing, wherein said housing includes a base and a mounting portion, wherein said mounting portion includes a first recessed area and a second recessed area, wherein said mounting portion includes a raised fin, wherein said mounting portion includes an upper point;
   removing said lower jaw of said skull;
   creating a plurality of openings within an upper mouth plate portion of said skull;
   cleaning, degreasing and drying said skull;
   positioning said skull on said mounting portion, wherein a first side of said upper jaw is positioned within said first recessed area and a second side of said upper jaw is positioned within said second recessed area;
   filling said skull with said bonding agent and applying said bonding agent to said housing;
   securing said skull to said housing with a bonding agent;
   sanding and sculpting said bonding agent to achieve a seamless appearance;
   applying a sealing agent to said skull; and
   coating said skull and said housing with a finishing agent.

* * * * *